United States Patent [19]
Chambos et al.

[11] 3,874,259
[45] Apr. 1, 1975

[54] POTATO CUTTING MACHINE

[75] Inventors: James Chambos, Williamsville, N.Y.; James Whiteley; S. Arthur Roxy, both of Sarasota, Fla.

[73] Assignee: said James Whiteley and said S. Arthur Roxy to said James Chambos, Williamsville, N.Y.

[22] Filed: Apr. 9, 1973

[21] Appl. No.: 348,942

[52] U.S. Cl............... 83/9, 83/12, 83/408, 83/423, 83/431, 83/733, 83/856, 83/425.1
[51] Int. Cl......... B26d 3/08, B26d 7/06, B26d 4/80
[58] Field of Search......... 83/9, 408, 409, 423, 437, 83/431, 733, 856, 409.1, 401, 467, 857, 425, 425.1, 12

[56] References Cited
UNITED STATES PATENTS
2,156,645  5/1939  Waller .............................. 83/733 X
3,211,202  10/1965  Mason ........................... 83/425.1 X FOREIGN PATENTS OR APPLICATIONS
21,138  8/1893  United Kingdom................. 83/856
575,059  4/1924  France................................. 83/856

Primary Examiner—Abercrombie Willie G.
Attorney, Agent, or Firm—Christel & Bean

[57] ABSTRACT

A machine for cutting potatoes for deep frying wherein the potato is rotated and moved toward a cutter having a series of parallel scoring knives projecting toward the potato and extending along a radial line with respect to the axis of rotation of the potato. A slicing blade likewise extending radially is disposed at right angles to the axis of rotation of the potato for continuously slicing off the scored portions. A carriage is provided which is guided for movement toward and away from the cutters in a direction parallel to the axis of rotation of the potato and a driving motor is mounted on the carriage for movement therewith, the driving motor having a driven shaft which terminates in the potato-engaging and supporting element having prongs for engaging the potato to support the same and cause rotation thereof with said shaft.

5 Claims, 6 Drawing Figures

PATENTED APR 1 1975  3,874,259

POTATO CUTTING MACHINE

BACKGROUND OF THE INVENTION

The present invention relates to potato cutting machines and more particularly to machines for cutting continuous helical strips of potatoes preparatory to deep frying the same, such machines being particularly useful in restaurant operation.

A machine of this general type is shown in Ross U.S. Pat. No. 2,508,868 dated May 23, 1950. In this patent the potato or other vegetable is mounted at the end of a screw-threaded shaft which is screwed toward a stationary cutter. Prior art patent to Cupper et al U.S. Pat. No. 2,715,927 dated Aug. 23, 1955 shows a vegetable slicing machine having a cutting arrangement somewhat similar to that of the present apparatus but in the Cupper machine the vegetable is held stationary and the cutter rotates, the axis of rotation of the cutter being spaced to one side of the vegatable.

SUMMARY OF THE INVENTION

In the present invention a carriage is supported for longitudinal movement toward a stationary cutter and the carriage contains an electric driving motor having its axis parallel to the direction of movement of the carriage toward the cutter blades. The carriage including the driving motor and a chuck carried thereby is freely manually movable toward the cutting mechanism to present the end of a potato against such cutting mechanism to score the potato along concentric vertical lines and then slice off the scored portions continuously to form helical potato strips suitable for deep frying.

DESCRIPTION OF THE ILLUSTRATED EMBODIMENT

Figure 1:
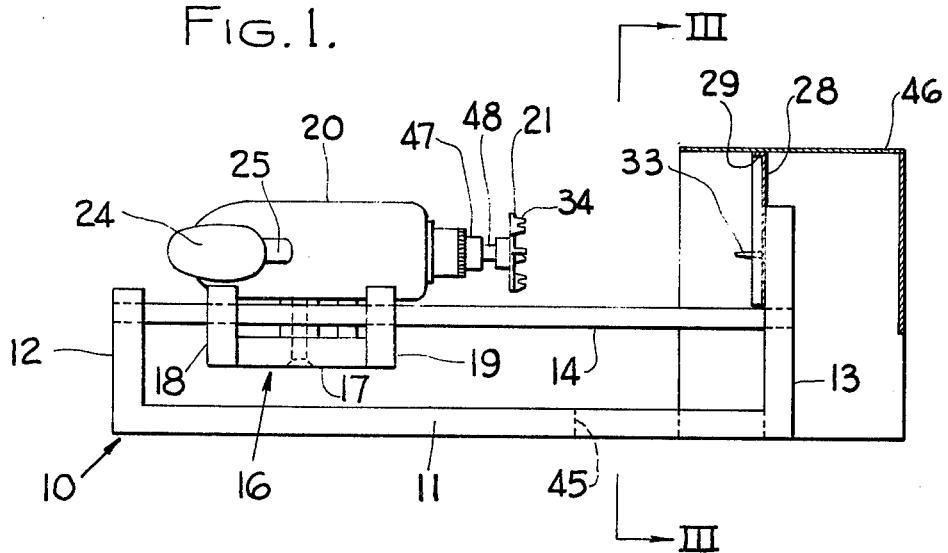
FIG. 1 is a general side elevational view of one form of the potato cutter of the present invention.

In the drawing the numeral 10 designates a general frame of the apparatus of the present invention which includes a bottom plate 11 and generally vertical end plates 12 and 13. A pair of parallel shaft members 14 are supported at their ends in end plates 12 and 13.

A carriage generally designated 16 is supported for free longitudinal sliding movement on shaft members 14 and includes a base 17 and end walls 18 and 19. The latter are bored to slide upon shaft members 14. A power unit is mounted on carriage 16 and includes a driving motor 20 and a potato supporting and engaging member 21 which is rotated on a longitudinal axis parallel to shaft members 14 by motor 20.

Figure 2:
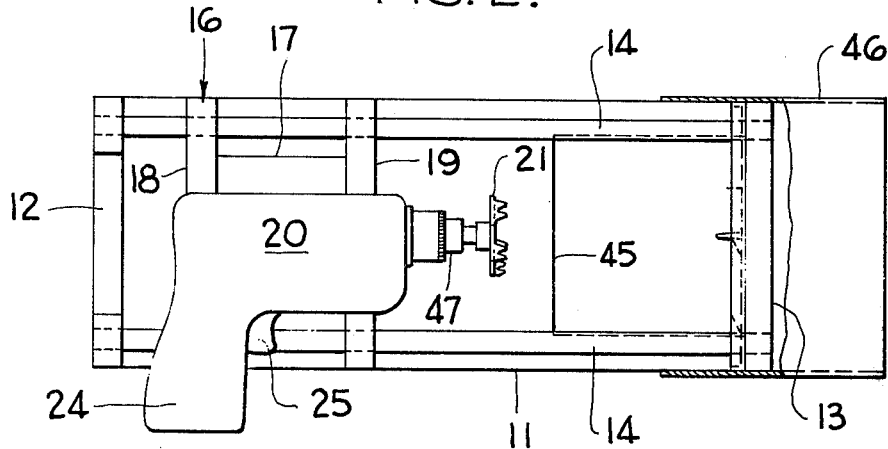
FIG. 2 is a top plan view thereof.

In the present instance a conventional portable power drill is employed as the power unit and includes a laterally projecting handle 24 and a trigger switch 25. Thus a user, after impaling a potato on potato-engaging member 21, may conveniently move the carriage 16 to the right as shown in FIGS. 1 and 2, which is toward a cutting mechanism which will presently be described, by merely grasping handle 24 and, when the potato reaches the cutting mechanism, cause rotation thereof by depressing the trigger switch 25.

The cutting mechanism is carried by a semi-circular plate 28 which is screwed to the inner face of end wall 13 above the shaft members 14. The cutting elements are generally similar to the arrangement shown in Cupper U.S. Pat. No. 2,715,927 in that they provide a series of parallel cutters designated generally by the numeral 30 in FIG. 3 to score the face of the potato along concentric circular lines and a follow-up slicer comprising a blade 31 which continuously slices off the scored portion of the potato as the potato advances to the right as viewed in FIGS. 1 and 2.

However, in the aforesaid Cupper patent the vegetable is held stationary and is not concentric with the cutter so that the scoring knives cut across the face of the vegetable and not in concentric circles so that the scored strips subsequently sliced from the vegetable in Cupper are not continuous.

Figure 3:
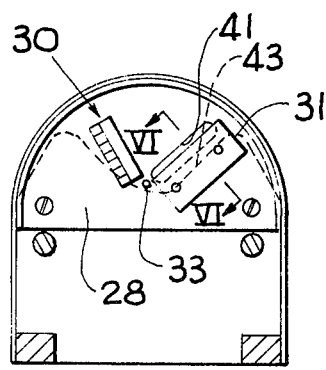
FIG. 3 is a cross-sectional view taken generally on the line III—III of FIG. 1.

The cutter mounting plate 28 is provided with a pin 33 and a potato to be cut is held between pin 33 and potato-engaging member 21 and the carriage is advanced to the right to cause teeth 34 of potato-engaging member 21 to engage the potato and force the same over pin 33 so that the potato is firmly supported between prongs 34 and pin 33. Pin 33 is disposed closely adjacent to the inner end of the cutting edge of blade 31 as shown in FIG. 3 and is coaxial with the axis of rotation of potato-engaging member 21.

Motor 20 is then started and pressure is exerted to keep the potato in engagement against cutter support plate 28. Rotation of the potato is clockwise as viewed in FIG. 3 so that it first encounters the concentric scoring knives of the member 30 and then the blade 31 which slices off the scored portion of the potato and thus produces more or less continuous spiral strips of potato.

Figures 4, 5:
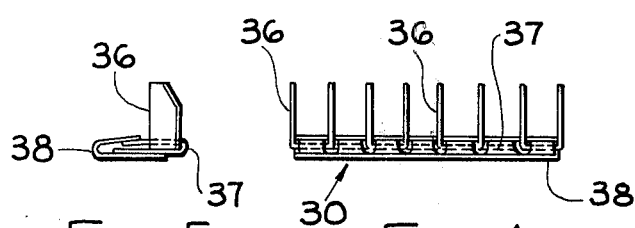
FIG. 4 is an elevational view of a cutter element of the apparatus of FIGS. 1 through 3.
FIG. 5 is an end elevational view of the cutter element of FIG. 4.

The present invention provides a novel scoring knife means which includes a series of U-shaped knife members designated 36 in FIGS. 4 and 5, each providing a pair of upstanding scoring knives. The U-shaped knife members 36 are engaged in a channel member 37 which is notched as shown in FIG. 4 to permit projection of the knife members. A second channel 38 engages over the ends of channel 37 to retain the knives in assembled position and the entire assembly shown in FIGS. 4 and 5 is screwed against mounting plate 28. The latter is preferably recessed to accommodate the channels 37 and 38 so that only the knives 36 project beyond the face of mounting plate 28.

Figure 6:
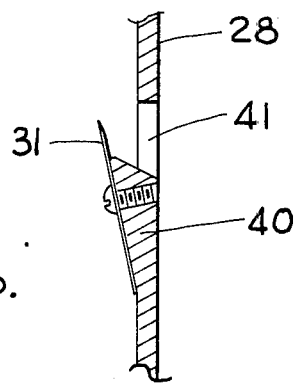
FIG. 6 is a cross-sectional view taken on the line VI—VI of FIG. 3.

As shown in FIG. 6, mounting plate 28 has an enlargement 40 which provides an inclined mounting for cutter blade 31 and mounting plate 28 is also provided with an adjacent opening 41 through which the sliced-off strips of potato project so that they are delivered to the right of end wall 13. End wall 13 is notched out as shown by the dotted line 43 in FIG. 3 to permit free discharge of the cut strips of potato.

An opening 45 in bottom plate 11 permits the final residue of the vegetable to fall through to a receptacle and if desired a tray may be disposed in opening 45 to receive such residue. It will be noted that the arcuate upper edge of cutter support 28 is provided with a flange 29 and a protective hood 46 rests upon flange 29 and may be removably attached thereto by screws.

As indicated earlier herein the driving motor 20 may comprise a conventional portable drill assembly including the usual chuck 47 and potato-engaging member 21 has a rearwardly extending shaft 48 which is removably engaged in chuck 47 in a conventional manner. Potato-engaging member 21 further is provided with an opening in its outer face for receiving pin 33 and the depth of this opening and the length of pin 33 are such that pin 33 bottoms in such opening to prevent prongs 34 of the cutter engaging element 21 from coming into contact with the cutter assembly proper.

A preferred embodiment of the present invention has been described and illustrated herein to illustrate the principles of the invention but it is to be understood that numerous modifications may be made without departure from the broad spirit and scope of the invention.

We claim:

1. A vegetable cutter comprising a frame including a cutter support, means for presenting an article of vegetable to said cutter support comprising a carriage and means supporting said carriage for guided linear movement toward and away from said cutter support, a driving motor on said carriage including a driven shaft having vegetable engaging means at the end thereof toward said cutter support, said shaft being rotatable on an axis parallel to the direction of movement of the carriage, said cutter support including a series of parallel blades projecting toward said carriage and extending in a radial row with respect to the axis of said shaft to score said vegetable along concentric circles, and a slicing blade extending generally at right angles to said shaft axis and spaced toward said carriage from said cutter support for continuously slicing said scored portions during rotation of said shaft to form a series of helical strips of said vegetable, said carriage being movable manually to hold said vegetable against said cutter support during operation of said cutter to produce sliced strips of uniform thickness, said frame including a base and said cutter support extending upwardly at one end thereof, guide support means extending upwardly at the opposite end of said base, and a pair of horizontal, laterally spaced, parallel guide rods extending fixedly between said cutter support and said guide support, said carriage being mounted for free movement along said guide rods.

2. A vegetable cutter according to claim 1 wherein said driving motor has a housing including a laterally projecting handle for manually moving the carriage on said support means.

3. A vegetable cutter according to claim 2 wherein said housing has a control switch adjacent to said handle for controlling the operation of said driving motor.

4. A vegetable cutter according to claim 1 wherein said driving motor includes an enclosing housing and an output shaft projecting therefrom with said vegetable-engaging means fixed to the end thereof toward said cutter support.

5. A vegetable cutter according to claim 1 having switch means mounted upon and movable longitudinally with said carriage for manually controlling the operation of said driving motor.

* * * * *